United States Patent [19]

Sudbrack et al.

[11] Patent Number: 4,815,373
[45] Date of Patent: Mar. 28, 1989

[54] BALE MOISTURE LIMIT MONITORING

[75] Inventors: Cecil R. Sudbrack, New Holland; Richard P. Strosser, Akron, both of Pa.

[73] Assignee: Ford New Holland, Inc., New Holland, Pa.

[21] Appl. No.: 56,074

[22] Filed: Jun. 1, 1987

[51] Int. Cl.⁴ .................... B30B 15/26; B30B 9/30
[52] U.S. Cl. ............................. 100/41; 100/43; 100/191; 100/50
[58] Field of Search ............ 100/41, 43, 191, 192, 100/189, 50; 56/341; 364/550, 558

[56] References Cited

U.S. PATENT DOCUMENTS

| | | | |
|---|---|---|---|
| 4,166,414 | 9/1979 | Fleming et al. | 100/43 |
| 4,168,659 | 9/1979 | Yatcilla et al. | 100/43 |
| 4,280,403 | 7/1981 | Alderson | 100/43 |
| 4,624,180 | 11/1986 | Strosser | 100/41 |
| 4,627,341 | 12/1986 | Sudbrack et al. | 100/41 |
| 4,729,301 | 3/1988 | Smith et al. | 100/43 |
| 4,750,418 | 6/1988 | Naaktgeboren | 100/43 X |

Primary Examiner—Andrew M. Falik
Attorney, Agent, or Firm—Griffin, Branigan, & Butler

[57] ABSTRACT

In a rectangular baler wherein a plunger is reciprocated by connecting rods to force crop material through a bale casing, and a microprocessor-based control circuit monitors the stress in the connecting rods to develop a digital value representing the pressure which should be applied to the tension rails of the casing in order to obtain baled crop material of desired density, the digital value is compared with upper and lower limits of the pressure which may be applied to the tension rails. If the digital vaue falls below the lower limit or exceeds the upper limit a visual indication of the condition is displayed for the operator.

4 Claims, 2 Drawing Sheets

BALE MOISTURE LIMIT MONITORING

RELATED DISCLOSURES

This application is related to Strosser U.S. Pat. No. 4,624,180, the disclosure of which is incorporated herein by reference.

BACKGROUND OF THE INVENTION

The present invention relates to rectangular balers of the type disclosed in U.S. Pat. No. 4,624,180, and more particularly to a method and means for indirectly monitoring the moisture content of the crop material being baled.

With the baler disclosed in the aforementioned patent it is possible for an operator to continue a baling operation even though the moisture content of the crop material is too high or too low. The operator first learns that the crop material is too dry when he looks behind the baler and sees a cloud of dust. A "too wet" condition becomes evident to the operator when the wet crop material begins to clog the baler. In either case, several bales containing poor quality hay are formed before the operator recognizes that the moisture content is outside acceptable limits.

In the Strosser patent a microprocessor-based control system monitors and controls a rectangular baler. One of the conditions controlled is the tension rail pressure, i.e. the pressure applied to side rails of the bale casing. The microprocessor monitors the force exerted on the connecting rods of a plunger which forces the crop material through the bale casing, and in response to the connecting rod force, adjusts the pressure on the tension rails so that a uniform crop density, selected by an operator, is maintained. It has been found that if the crop material is too dry, the coefficient of friction between the tension rails and the crop material being forced between the rails drops. This causes a drop in the connecting rod force. The microprocessor attempts to correct the condition by applying a higher pressure to the tension rails but there is a limit beyond which the hydraulic system may fail.

If the crop material is too wet, the coefficient of friction between the tension rails and the crop material increases thus causing an increase in the connecting rod pressure. To correct for this the microprocessor causes the tension rail pressure to be reduced but it cannot be reduced below zero. Thus, if the moisture content of the crop material is either too high or too low, the microprocessor is unable to adjust the tension rail pressure to obtain uniform bale density and in this event it is desirable that the operator be informed.

SUMMARY OF THE INVENTION

An object of the present invention is to provide a method and apparatus for monitoring crop moisture in a rectangular baler.

An object of the invention is to provide a method and apparatus for monitoring crop moisture indirectly by monitoring the pressure applied to the casing tension rails to produce a given connecting rod pressure.

A further object of the invention is to provide a method and apparatus for determining when the moisture content of a material being baled is outside acceptable limits and providing an indication to an operator when the crop material is unsuitable for baling.

In accordance with the principles of the present invention the pressure applied to the tension rails of a bale casing is monitored. If the pressure equals a first limit for a given number of plunger cycles, or equals the second limit for a given number of plunger cycles, an indication is given to the operator as to which limit has been reached. Monitoring of the pressure applied to the tension rails is accomplished by a microprocessor and a display and control panel provides an audible and visual indication to the operator when a pressure limit has been reached. Other objects and advantages of the invention as well as its mode of operation will become apparent upon consideration of the following description and the accompanying drawing.

DESCRIPTION OF A PREFERRED EMBODIMENT

Figure 2:
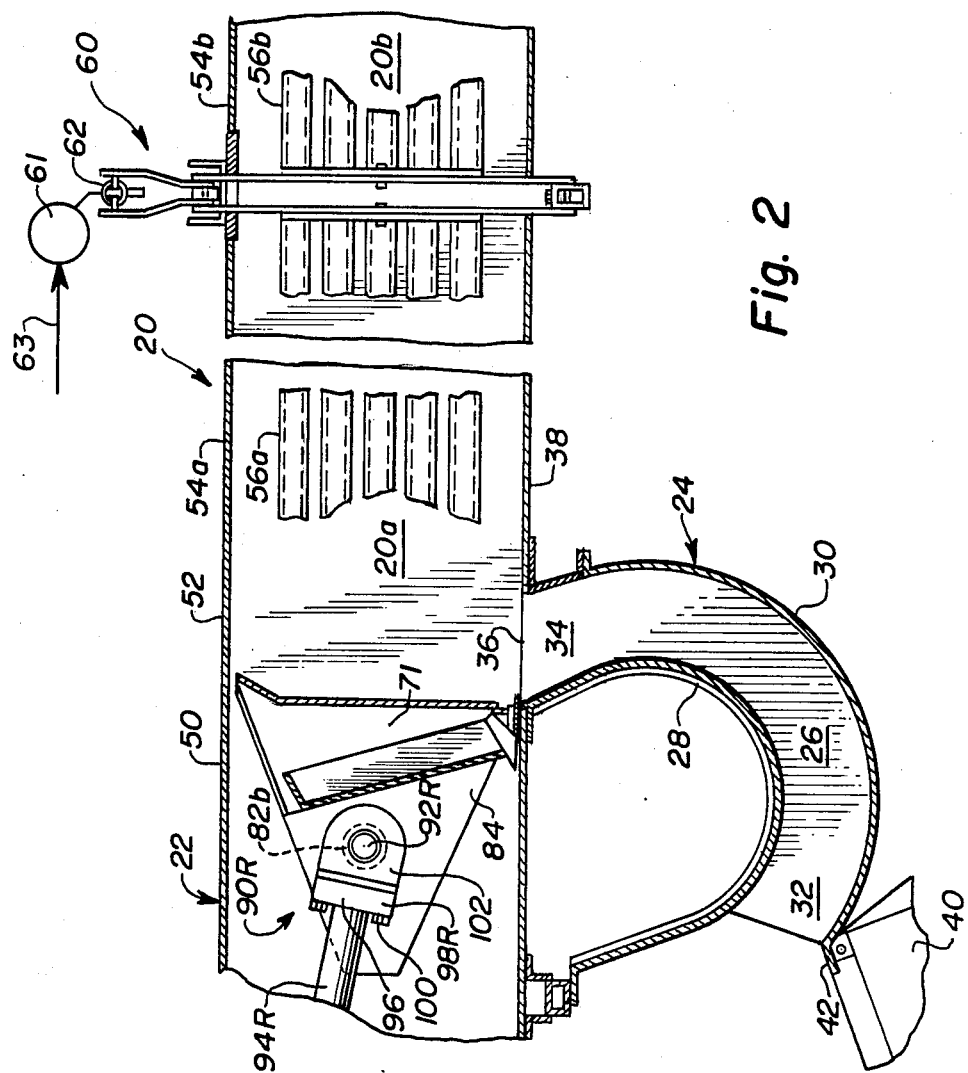
FIG. 2 is a side sectional view of a rectangular baler.

FIG. 2 shows a portion of a rectangular baler including a rectangular bale casing 20 defining a bale forming chamber. This baler is fully disclosed in Strosser U.S. Pat. No. 4,624,180. As the baler is moved along a windrow a pickup device 40 picks up crop material which is fed through a feed chamber 24, the crop material entering the bale forming chamber through an opening 36. Connecting rods (conrods) reciprocate a plunger 71 and on each cycle the plunger forces the crop material entering the bale forming chamber into a region of the casing defined by top movable tension rails 54a, 54b and side tension rails 56a, 56b.

Figure 3:
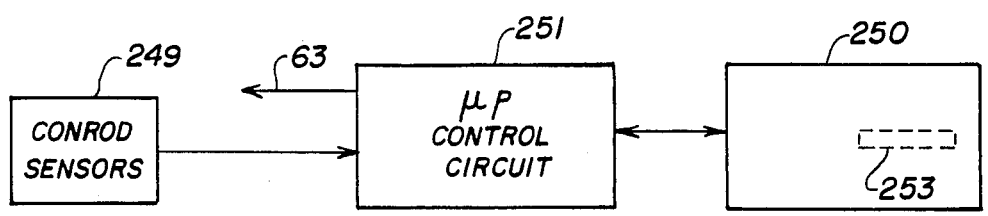
FIG. 3 is a block diagram of a microprocessor-based control circuit for practicing the invention.

The tension rails may be moved transverse to the longitudinal dimension of the bale casing to thereby vary the degree of resistance provided by the casing to movement of crop material being forced through the casing by plunger 71. By adjusting the tension rails the density of the baled crop material may be controlled. A tensioning system 60 comprising a servo valve 61 and a hydraulic cylinder unit 62 controls the adjustment of the tension rails in response to a signal on lead 63 produced by a control circuit 251 (FIG. 3).

There are two conrods connected to plunger 71, the right conrod 94R being shown in FIG. 2. The right conrod is connected to a wrist pin 92R as more fully described in the Strosser patent and sensor means 249 (FIG. 3) are provided for measuring shear stress in the wrist pins.

The signals produced by the sensor means 249 are fed to a microprocessor-based control circuit 251 the details of which are shown and described in the Strosser patent. The control circuit includes means for analyzing the signals from the sensors and input data such as desired bale density provided by an operator through an operator's panel 250, and means for computing therefrom a digital value PWM representing the duration of a pulse width modulated signal which must be applied to the servo valve 61 so that the rails will provide a given resistance to movement of crop material through the bale casing 20. This in turn determines the density of the crop material baled. The digital value PWM is converted to a pulse width modulated signal by the control circuit and applied to the servo valve 61.

FIGS. 9A and 9B of the Strosser patent show the steps performed by the control circuit during a program routine LOOP to derive the digital value PWM and convert it to a pulse width modulated signal for controlling the tension rails.

Figure 1:
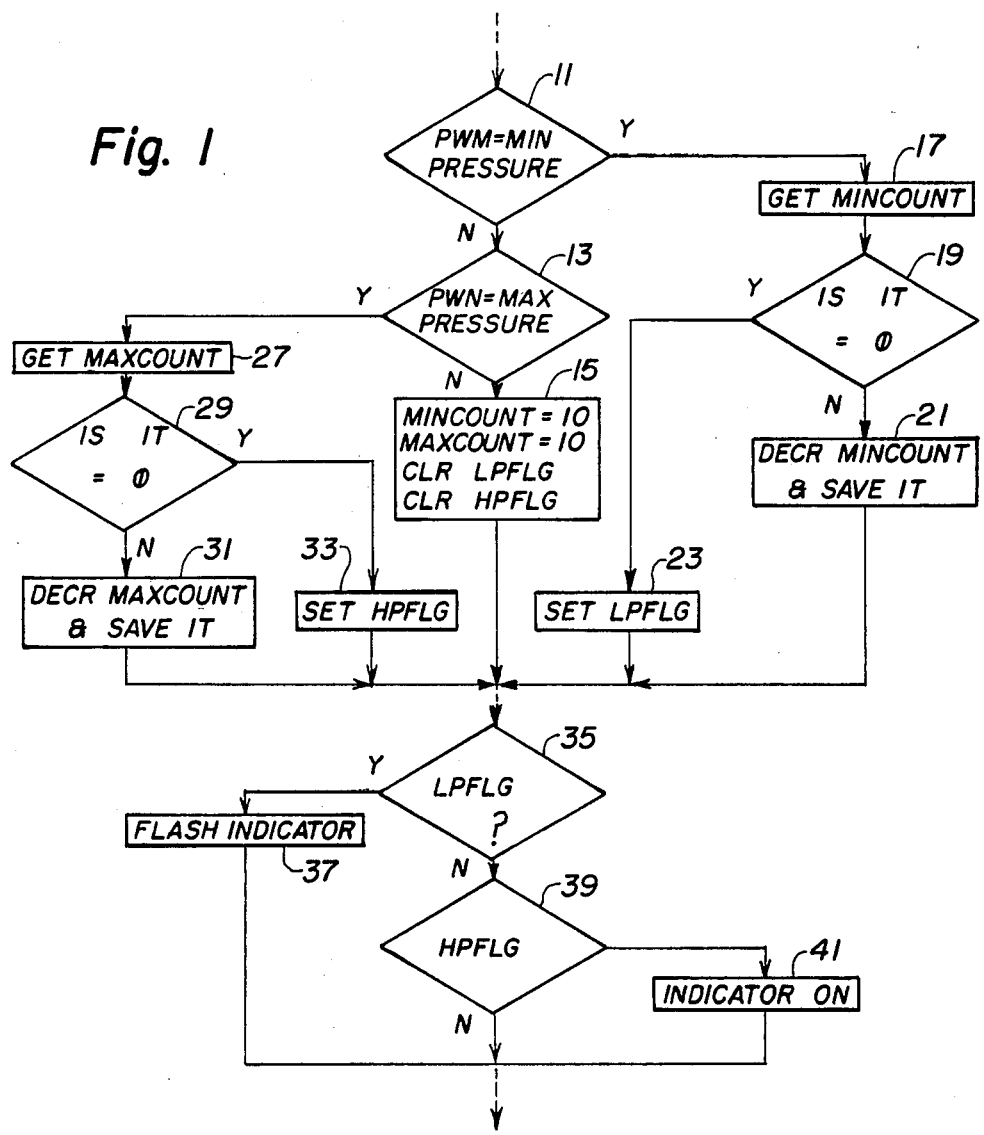
FIG. 1 is a flow diagram illustrating a modification of a microprocessor program to provide for testing a value representing tension rail pressure against maximum and minimum pressure limits.

In accordance with the present invention the routine LOOP is modified by inserting between steps 440 and 442 a subroutine comprising the steps shown in FIG. 1. The control circuit 251 includes means for comparing the digital value PWM with values representing upper and lower pressure limits by executing the subroutine. The subroutine is entered after the digital value PWM has been computed, PWM representing the required rail tension pressure required for the sensed conrod force. At step 11 PWM is tested to see if it is 0. If it is not 0 then at step 13 PWM is tested to see if it is equal to 239, a value representing the maximum permissible pressure that can be applied to the tension rails. If the test at step 13 shows that the value of PWM is not above the maximum the program proceeds to step 15 where locations MINCOUNT and MAXCOUNT are both set to 10 and the low and high pressure flags LPFLG and HPFLG are cleared. MINCOUNT and MAXCOUNT serve as counters for counting the number of times the routine LOOP is executed (i.e. number of strokes of the plunger) and PWM is at the minimum or maximum value. The flags LPFLG and HPFLG are subsequently sensed to control indications at the operator's panel 250.

If the test at step 11 shows that PWM is 0 the program gets MINCOUNT at step 17 and tests it at step 19. If MINCOUNT is not 0 then it is decremented and saved at step 21 for use at step 17 the next time LOOP is executed. If LOOP is executed ten times and the pressure proves to be 0 at step 11 then MINCOUNT is decremented ten times so that the test at step 19 proves true. The program sets LPFLG at step 23 before continuing as described in the Strosser patent.

Steps 27, 29, 31 and 33 correspond to steps 17, 19, 21 and 23 except that they control the decrementing of MAXCOUNT (step 27) and the setting of HPFLG (step 33) if ten executions of LOOP show that PWM is greater than the maximum permissible tension rail pressure.

When the control circuit is preparing to update the display on the operator's panel 250, it tests LPFLG at step 35. If LPFLG is set the control circuit sends signals (step 37) to the operator's panel to intermittently flash an indicator 253 designated "control pressure". If the test at step 35 shows that LPFLG is not set, then HPFLG is tested at step 39. If HPFLG is set the control circuit sends signals (step 41) to the operator's panel to continuously light the indicator 253. After step 37 or step 39 the program proceeds as described in the Strosser patent.

From the foregoing description it is evident that the present invention provides a simple method and apparatus whereby the moisture content of crop material may be indirectly monitored and an operator notified when the moisture content is outside a moisture content range necessary for forming bales of an operator-designated density.

While a preferred embodiment of the invention has been described in specific detail, it will be understood that various substitutions and modifications may be made in the described embodiment without departing from the spirit and scope of the invention as defined by the appended claims.

The embodiments of the invention in which an exclusive property or privilege is claimed are defined as follows:

1. A method of monitoring the moisture content of crop material being baled in a rectangular baler having movable tension rails for compressing the crop material as it is forced through a bale casing by a plunger, said method comprising:
   sensing the plunger force required to drive the crop material through the casing;
   computing from the sensed plunger force a value representing the pressure that should be applied to the tension rails to obtain a bale of crop material of a preselected density;
   comparing said computed value to upper and lower limits of a range of pressures that may be applied to the tension rails; and,
   indicating when said computed value falls outside said range.

2. The method as claimed in claim 1 wherein the indicating step comprises visually indicating when said computed value falls outside said range.

3. Apparatus for monitoring the moisture content of crop material being baled in a rectangular baler having movable tension rails for compressing the crop material as it is forced through a bale casing by a plunger, said apparatus comprising:
   means sensing the plunger force required to drive the crop material through the casing;
   means for computing from the sensed force a value representing the pressure that should be applied to the tension rails to obtain a bale of crop material of a preselected density;
   means for comparing said computed value to upper and lower limits of a range of pressures that may be applied to the tension rails; and,
   means for indicating when said computed value falls outside said range.

4. Apparatus as claimed in claim 3 wherein said means for indicating comprises a visual indicator and means for energizing said indicator in a first or a second mode to indicate that said computed value is equal to said upper limit or said lower limit, respectively.

* * * * *